April 5, 1932.  E. G. HAZEL  1,852,884
GRASS CLIPPER
Filed April 25, 1931  2 Sheets-Sheet 1

Eugene G. Hazel
INVENTOR

BY Victor J. Evans
and Co.  ATTORNEYS

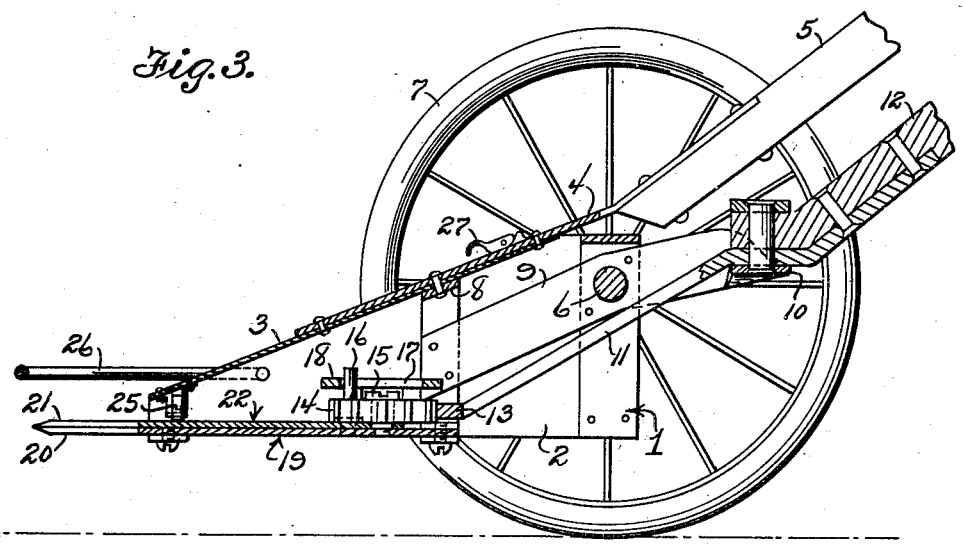
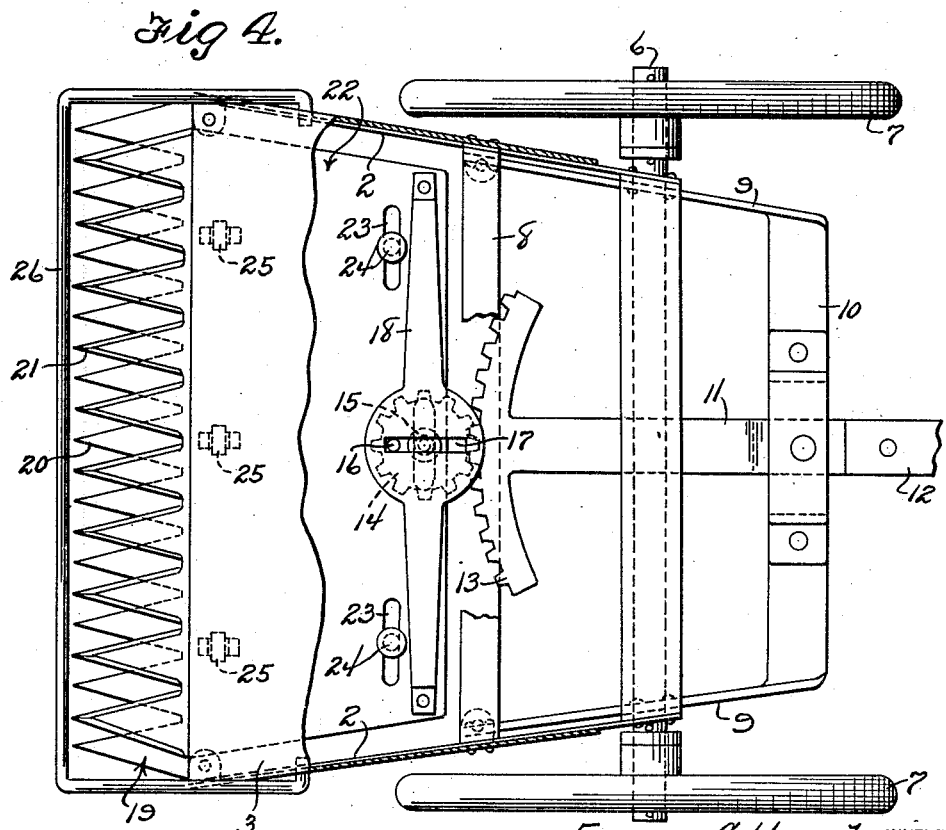

Patented Apr. 5, 1932

1,852,884

UNITED STATES PATENT OFFICE

EUGENE G. HAZEL, OF ORLANDO, FLORIDA

GRASS CLIPPER

Application filed April 25, 1931. Serial No. 532,947.

This invention relates to improvements in grass clippers and has for the primary object the provision of a device of the above stated character especially adaptable for permitting a person to easily and quickly cut grass, weeds, and the like with the expenditure of minimum effort and also permit grass or weeds that are inaccessibly located and cannot be cut with the usual type of mower to be efficiently cut to the desired height.

Another object of this invention is the provision of a device employing a cutting means of the reciprocating type supported by ground wheels and provided with a hand operating means whereby a person may conveniently move the device over the ground and at the same time actuate the cutting means so that grass, weeds, and the like, of varying growth may be easily cut to the desired height.

A further object of this invention is the provision of a grass clipper of the above stated character which will be simple, durable and efficient, and which may be manufactured and sold at a comparatively low cost.

With these and other objects in view, this invention consists in certain novel features of construction, combination and arrangement of parts, to be hereinafter more fully described, and claimed.

For a complete understanding of my invention, reference is to be had to the following description and accompanying drawings, in which Figure 1 is a top plan view illustrating the grass clipper constructed in accordance with my invention.

Figure 3 is a sectional view taken on the line 3—3 of Figure 1.

Figure 4 is an enlarged horizontal view illustrating a means for reciprocating the movable cutter blade.

Figure 1:
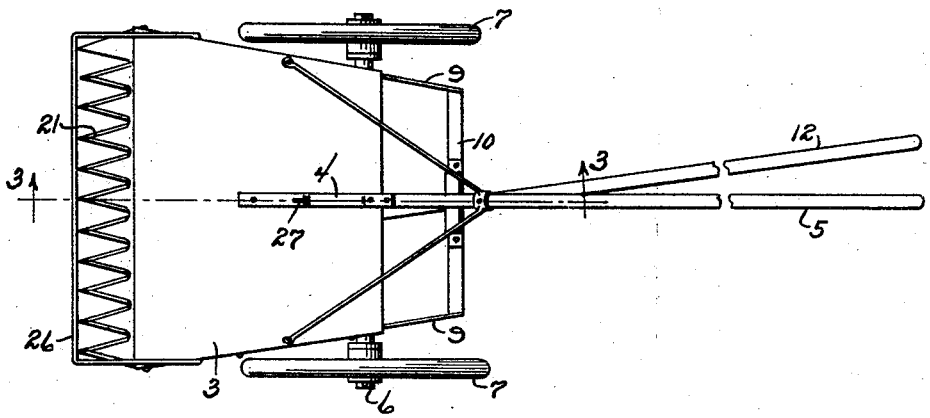
Figure 2:
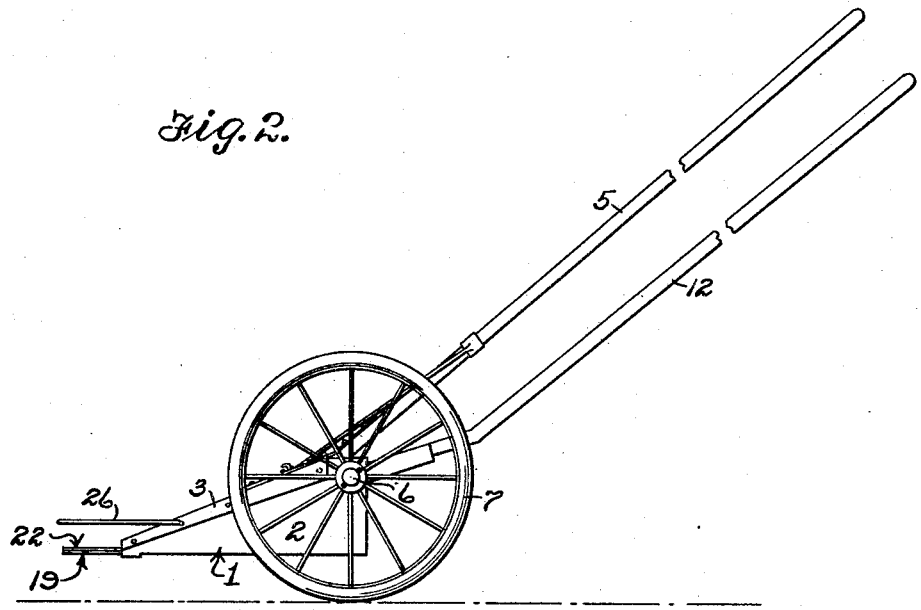
Figure 2 is a side elevation illustrating the same.

Referring in detail to the drawings, the numeral 1 indicates a housing or supporting structure in which the side walls 2 are tapered or reduced toward the rear end and support an inclined cover 3 and to which is secured a rearwardly extending plate 4 carrying a handle 5 for the purpose of permitting a person to push or propel the device over the ground. An axle 6 is carried by the side walls 2 adjacent the open rear end of the housing or supporting structure 1 and has journaled thereon ground wheels 7. The walls of the structure or housing 1 are reinforced by vertical and transversely extending members 8 to which are secured rearwardly extending arms 9 connected by a transverse member 10 disposed rearwardly of the axle 6 and has pivotally secured thereto an operating arm 11 one end of which is bent angularly in an upward and rearward direction and has secured thereto an operating handle 12. The other portion of the arm 11 extends forwardly and downwardly from the pivot and carries at its free end a segmental gear 13 meshing with a pinion 14 journalled to the bottom wall of the housing 1 by a pin 15. The pinion 14 has a wrist pin 16 eccentrically secured thereto which operates in a slot 17 formed in a reciprocating bar 18.

A stationary blade 19 is detachably secured to the bottom wall of the housing 1 and is provided with a series of teeth 20 having bevelled cutting edges and which teeth co-operate with a series of teeth 21 forming part of a movable blade 22 slidably mounted on the stationary blade and connected to the ends of the reciprocating bar 18. The movable blade 22 is provided with slots 23 that receive pins 24 carried by the stationary blade for the purpose of slidably connecting the movable blade to the stationary blade. The forward edge of the cover 3 is provided with rollers 25 engaging the upper face of the movable blade 22 co-operating with the pins and slidably supporting the movable blade.

The teeth on the pinion 14 and the teeth on the segmental rack 13 are of such a number that during a single or one complete movement of the operating handle 12, the pinion will make one complete revolution and one revolution of the pinion transmits to the movable blade two complete movements of the movable blade relative to the stationary blade.

In operation, a person moves the device over the ground by the handle 5 with one hand and with the other hand oscillates the handle 12 on its pivot which causes a reciprocation of the movable blade 22 relative to the stationary blade, whereby grass and the like caught between the teeth will be effectually severed. By moving the handle 5 upwardly or downwardly the relation of the cutting teeth of the blades may be varied relative to the ground, consequently permitting the grass to be cut at different heights and with the cutting teeth disposed at the front of the device permits grass, weeds and the like located at inaccessible places to be easily cut or severed.

A substantially U-shaped member 26 has its ends pivoted to the side walls for the purpose of forming a guard by the bight portion thereof being disposed above and slightly in advance of the free ends of the teeth to prevent the teeth from coming in contact with obstacles that may injure or mar said teeth. The member 26 forming the guard is capable of pivotal movement and may be swung upwardly and rearwardly and held in this position by a catch 27 when not desiring to employ the guard. When the member 26 is in the position shown in Figures 3 and 4, it is supported by the forward corners of the supporting structure or housing 1.

While I have shown and described the preferred embodiment of my invention, it will be understood that minor changes in construction, combination and arrangement of parts may be made without departing from the spirit and scope of my invention, as claimed.

Having thus described my invention, what I claim is:

1. A grass clipper comprising a portable supporting structure, a handle for said structure, a stationary blade carried by the structure and having a plurality of teeth, a movable blade slidably mounted in the structure and having a plurality of teeth adapted to reciprocate relative to the teeth of the stationary blade, a pinion journalled to the structure, manual actuating means for rotating the pinion in opposite directions, and means for transmitting movement from the pinion to the movable blade.

2. A grass clipper comprising a portable supporting structure, manual propelling means for said structure, a stationary blade carried by the structure, a movable blade carried by the structure and adapted to reciprocate relative to the stationary blade, a pinion journalled to the structure, an actuating bar connected to the movable blade and having a slot, a pin eccentrically secured to the pinion and operating in the slot, an operating arm pivoted to the structure, a segmental gear carried by said arm and meshing with the pinion, and a handle secured to the operating arm operable to reciprocate the movable blade relative to the stationary blade.

In testimony whereof I affix my signature.

EUGENE G. HAZEL.